United States Patent [19]

Francis

[11] Patent Number: 5,349,469
[45] Date of Patent: Sep. 20, 1994

[54] OPTICAL MODE SWITCHING SYSTEM

[75] Inventor: Melvin Francis, Midland, Canada

[73] Assignee: Hughes Aircraft Company, Los Angeles, Calif.

[21] Appl. No.: 994,578

[22] Filed: Dec. 22, 1992

[51] Int. Cl.$^5$ .............................. G02B 27/00
[52] U.S. Cl. ................................... 359/420
[58] Field of Search ............... 359/419, 420

[56] References Cited

U.S. PATENT DOCUMENTS

| | | | |
|---|---|---|---|
| 2,388,673 | 11/1945 | Brown | 359/420 |
| 2,512,153 | 6/1950 | Henyey et al. | 359/420 |
| 2,527,719 | 10/1950 | Greenstein et al. | 359/420 |
| 3,749,494 | 7/1973 | Hodges | 359/419 |
| 5,161,051 | 11/1992 | Whitney et al. | 359/420 |

FOREIGN PATENT DOCUMENTS 615913 3/1963 Canada .................. 359/419

*Primary Examiner*—Edward K. Look
*Assistant Examiner*—James A. Larson
*Attorney, Agent, or Firm*—Michael W. Sales; Wanda K. Denson-Low

[57] ABSTRACT

An optic mode switching system 14 provides for switching between two or more optic modes by movement of an eye 24. The system 14 comprises a first optic system 10 which provides a first image at a first position 25. The system 14 also comprises a second optic system 12 which provides a second image at a second position 40. The viewer switches optic modes by moving eye 24 from the first position 25 in the eyepiece to the second position 40 during viewing.

11 Claims, 1 Drawing Sheet

OPTICAL MODE SWITCHING SYSTEM

BACKGROUND OF THE INVENTION

1. Field of the Invention

The present invention generally relates to an apparatus for switching the mode of operation of an optical system. More particularly, the present invention relates to an apparatus for switching parameters of an optical system, such as magnification or field of view, without any moving parts of the system.

2. Description of the Prior Art

Conventional magnification change in an optical system is typically provided by zoom telescopes or systems with movable and switchable components. Optical systems for day and night operation require expensive switching components, performance reducing beam splitters or the use of separate day and night systems to change from a day mode of operation to a night mode of operation and back. The disadvantages of such mode switching systems include high manufacturing costs, low optical performance as well as the need for manual operation of levers and the like. The disadvantages of the prior art systems described above is that they often result in image instability. Where such optic systems are used to site projectile targets, the disadvantages lead to lower hit probabilities as well as potentially less covert operation. Also, the reliance of prior art systems on mechanical devices for such optical changes lowers the reliability of the optic system.

SUMMARY OF THE INVENTION

The present invention relates to an optical mode switching system for providing a plurality of image modes to an eye at an eyepiece. The system comprises a first optic system that provides a first image to the eye at a first position defined at a first exit pupil. The first optic system further comprises a first objective lens, an inverting prism, and a first eyepiece. Light enters the first optical system by passing through the first objective lens, through the inverting prism and through the first eyepiece so as to form the first exit pupil. The system also comprises a second optic system that provides a second image to the eye at a second position defined at a second exit pupil. The second exit pupil is disposed adjacent to the first exit pupil. The second optic system further comprises a second objective lens, a first field lens, a first relay lens, a first inclining prism and a second eyepiece. Light enters the second optic system by passing through the second objective lens, through the first field lens, through the first relay lens, and through the second eyepiece so as to form the second exit pupil.

One objective of the present invention is to provide a mode switch for an optic system that does not use opto-mechanical mechanisms, external controls or levers.

Another objective of the present invention is to provide a mode switch for an optic system requiring no physical movements other than movement of the viewer's eye to effect mode changes.

Another objective of the present invention is to provide a mode switch for an optic system having fast, stable and covert operation of the mode change.

Other objects and advantages of the present invention will become apparent to those skilled in the art from the following detailed description read in conjunction with the attached drawing and claims appended hereto.

DETAILED DESCRIPTION OF THE INVENTION

Figure 1:
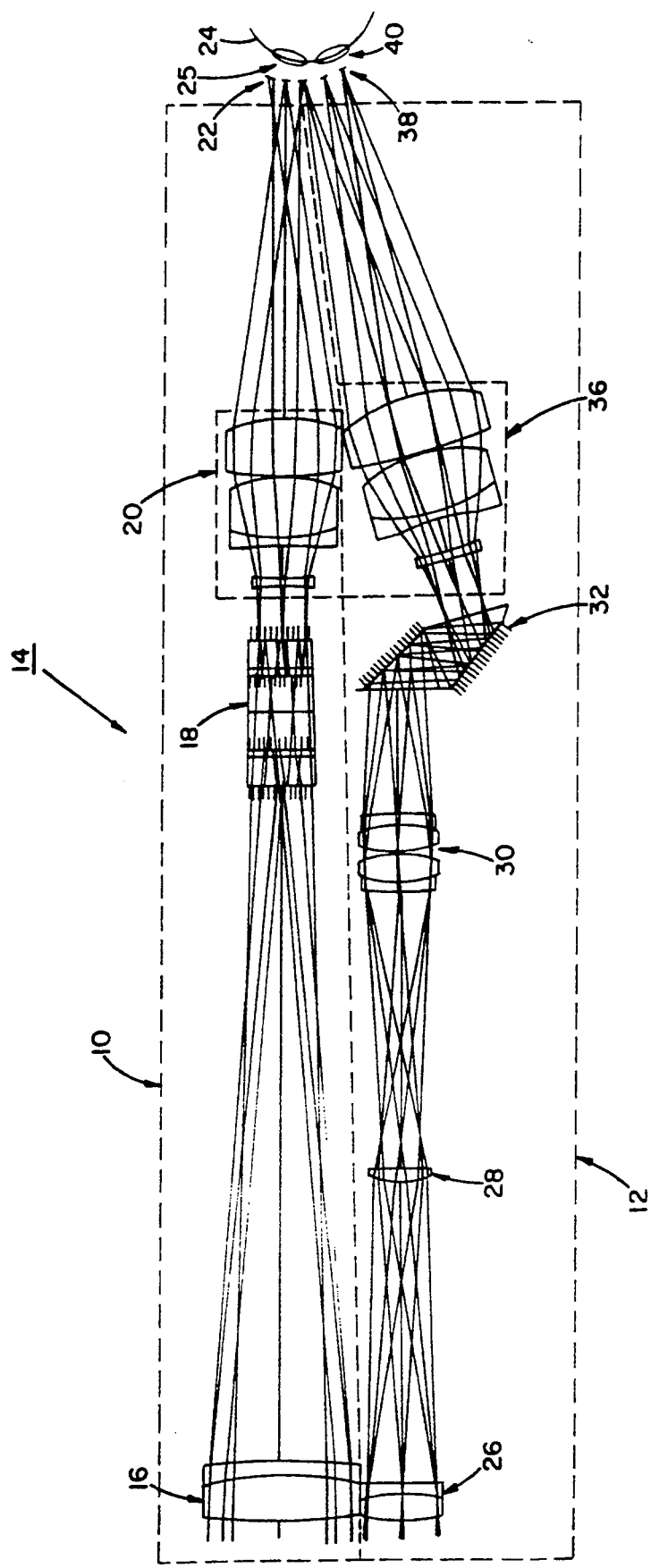
FIG. 1 is a schematic diagram, not drawn to scale, of the optic mode switch of the present invention.

FIG. 1 shows a schematic diagram of a dual magnification sight employing the optic mode switching technique of the present invention for rapidly changing the magnification of the sight. An upper ×6 power scope system 10 and a lower ×1.7 scope system 12 are arranged and vertically integrated into a single housing 14 for mounting on a rifle or other support (not shown). Light enters the upper system 10 through an upper achromatic objective lens 16. The light from the objective lens 16 is passed through an inverting prism 18 and an upper eyepiece 20 so as to form an upper exit pupil 22 that can be viewed by an observer's eye at position 25. Light simultaneously enters the lower system 12 through a lower achromatic objective lens 26. The light from the lower objective lens 26 is passed through a field lens 28, a relay lens 30, an inclining prism 32 and a lower eye piece 36 so as to form a lower exit pupil 38 that can be viewed at position 40. In this embodiment, the upper objective lens 16 is positioned adjacent to the lower objective lens 26 so as to provide the same approximate viewing line-of-sight.

Mode switching with the present invention is accomplished by a simple movement of eye 24 from the first position 25 to the second position 40. The arrangement of the upper optical system 10 and the lower optical system 12 provides two adjacent exit pupils 22 and 38. The image of upper optical system 10 may be viewed by moving the eyeball 24 to the first position 25. Similarly, the image of the lower optical system 12 may be viewed by moving the eyeball 24 to the second position 40. The lines-of-sight of the eyepieces 20 and 36 of the upper 10 and lower optic systems 12 are preferably inclined so as to allow mode changing with minimal eye movement and without need for moving the observer's head while the lines-of-sight of the objective lenses 16 and 26 remain substantially parallel so as to provide essentially the same viewing line-of-sight. The degree of inclination can vary according to the relative exit pupil sizes and field of view of each system being integrated.

The optical mode switching system of the present invention provides a useful device for aiming gun sights where dual magnification or day/night operation is required. The technique of the present invention may also be applied to other optical devices, such as microscopes and other medical or ophthalmic viewing devices.

Although one particular embodiment having two optical systems integrated for accomplishing an optical mode change has been described herein, it will be appreciated by those skilled in the art after careful study of the detailed description of the invention herein that more than two optical systems may be combined so as to provide a plurality of modes greater than two. In fact, the system described herein can have any number N of optic systems.

Thus, what has been described is an optical mode switching apparatus. The invention as described above admirably achieves the objects of the invention; however, it will be appreciated that departures can be made by those skilled in the art without departing from the spirit and scope of the invention, which is limited only by the following claims and the reasonable interpretation thereof.

What is claimed is:

1. An optical mode switching system for providing a plurality of closely spaced exit pupils to facilitate separate views of each exit pupil by a viewer's eye, comprising:
   a first optic system for providing a first image at a first position adjacent a first exit pupil; and
   N additional optic systems for providing N separate images at N corresponding additional exit pupils closely spaced to said first exit pupil, where N is an integer greater than zero, each of said N optic systems having a line-of-sight substantially parallel to a line-of-sight of said first optic system, whereby each of the N images is viewable by the viewer's eye with little eye movement and essentially no movement of the viewer's head.

2. The optical mode switching system of claim 1, wherein each of said N exit pupil are adjacent to said first exit pupil.

3. The optical mode switching system of claim 1, wherein N is equal to 1.

4. An optical mode switching system for providing a plurality of closely spaced exit pupils to facilitate separate views of each exit pupil by a viewer's eye, comprising:
   a first optic system for providing a first image at a first position adjacent to a first exit pupil; and
   N additional optic systems for providing N separate images at N corresponding additional exit pupils, closely spaced to said first exit pupil, where N is an integer greater than zero, each of said N optic systems having a line-of-sight substantially parallel to a line-of-sight of said first optic system, each of said N optic systems forming an exit pupil which is inclined with respect to said first exit pupil, whereby each of the N images is viewable by the viewer's eye with little eye movement and essentially no movement of the viewer's head.

5. An optical mode switching system providing a plurality of closely spaced exit pupils to facilitate separate views of each exit pupil by a viewer's eye, comprising:
   a first optic system comprising:
      a first objective lens, an inverting prism, and a first eyepiece, wherein the light from said image enters said first optical system by passing through said first objective lens, through said inverting prism and through said first eyepiece so as to provide a first exit pupil; and
   N additional optic systems for providing N corresponding additional exit pupils, where N is an integer greater than zero, each of said N exit pupils being adjacent to said first exit pupil, each optic system of said N additional optic systems further comprises:
      an objective lens, a field lens, a relay lens, an inclining prism and an eyepiece, wherein the light from an image enters said optic system by passing through said objective lens, through said field lens, through said relay lens, through said inclining prism, through said eyepiece so as to provide said corresponding additional exit pupil, wherein each objective lens of each optic system of said N optic systems has a line-of-sight substantially parallel to a line-of-sight of said objective lens of said first optic system.

6. The optical mode switching system of claim 5, wherein N is 1.

7. An optical mode switching system providing a plurality of closely spaced exit pupils to facilitate separate views of each exit pupil by a viewer's eye, comprising:
   a first optic system comprising:
      a first objective lens, an inverting prism, and a first eyepiece, wherein the light from said image enters said first optical system by passing through said first objective lens, through said inverting prism and through said first eyepiece so as to provide a first exit pupil; and
   a second optic system comprising:
      a second objective lens, a first field lens, a first relay lens, a first inclining prism and a second eyepiece, wherein the light from said image enters said second optic system by passing through said second objective lens, through said first field lens, through said first relay lens, through said first inclining prism, through said second eyepiece so as to provide a second exit pupil adjacent to said first exit pupil and wherein said second objective lens has a line-of-sight substantially parallel to a line-of-sight of said first objective lens.

8. A plurality of distinct optic systems for providing a plurality of separate images at a plurality of positions adjacent corresponding exit pupils, said distinct optic systems having lines-of-sight substantially parallel to each other such that each of said separate images is viewable by a viewer's eye with little eye movement and essentially no movement of the viewer's head.

9. An optical mode switching system comprising:
   a first optic system for providing a first image at a first position adjacent a first exit pupil and
   a second optic system for providing a second image at a second position adjacent a second exit pupil, closely spaced to said first exit pupil,
   whereby said first image and said second image are viewable by a viewer with little eye movement and essentially no movement of the viewer's head.

10. The invention of claim 9 further including means for inclining the line-of-sight of said first optical system relative to the line-of-sight of the second optical system.

11. The invention of claim 10 wherein said means for inclining the line-of-sight of said first optical system relative to the line-of-sight of the second optical system includes an inclining prism.

* * * * *